July 11, 1967     H. S. DEARLING     3,330,481
DISPERSANT DISPENSER OF AN ABSORBENT OR ABSORBENT MATERIAL
Filed Oct. 22, 1965     2 Sheets-Sheet 1
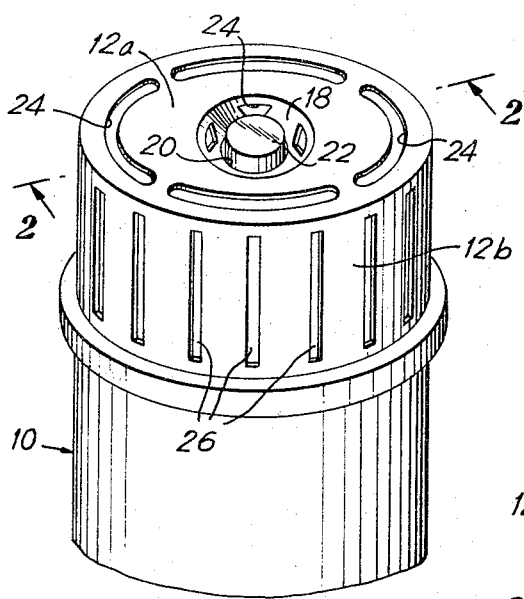
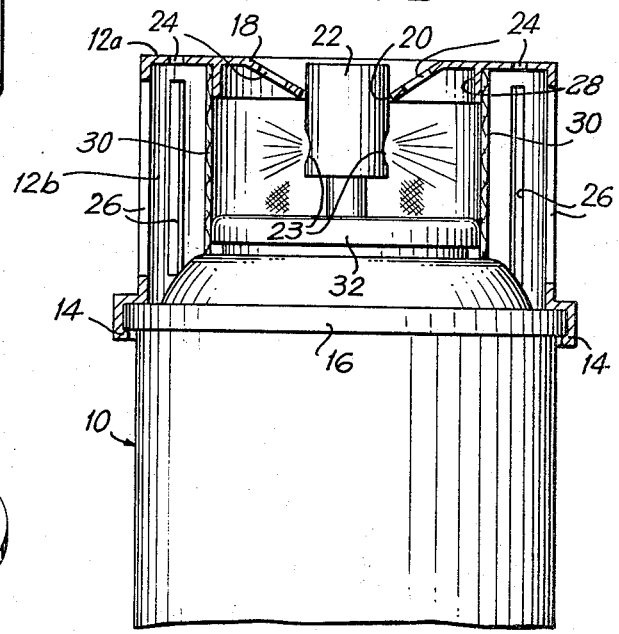
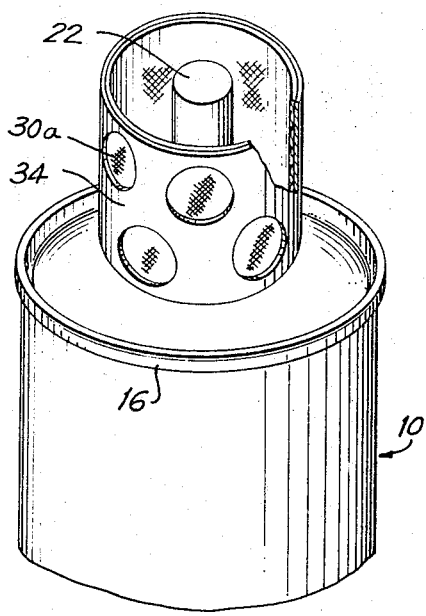
INVENTOR.
HARRY S. DEARLING
BY
Curtis, Morris & Safford
ATTORNEYS July 11, 1967 H. S. DEARLING 3,330,481
DISPERSANT DISPENSER OF AN ABSORBENT OR ABSORBENT MATERIAL
Filed Oct. 22, 1965 2 Sheets-Sheet 2
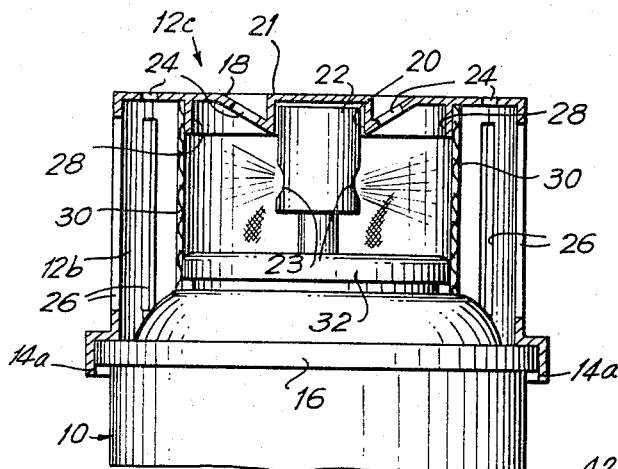
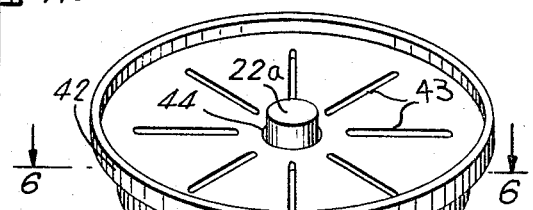
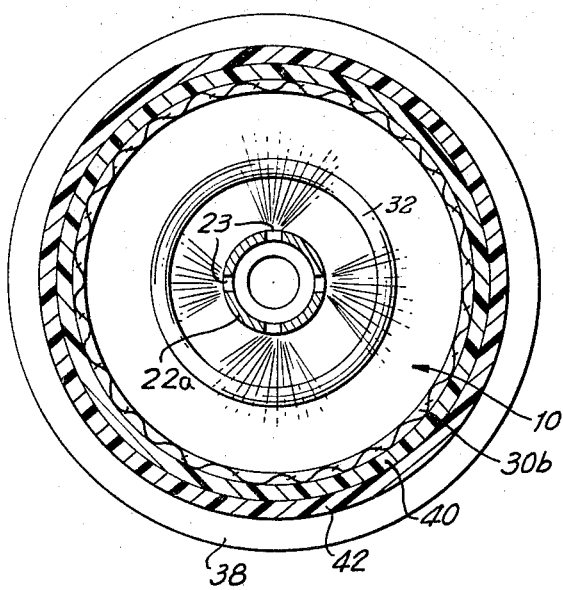
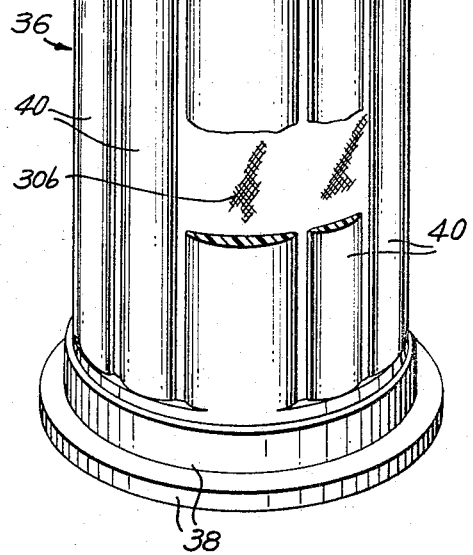
INVENTOR
HARRY S. DEARLING
BY
Curtis, Morris & Safford
ATTORNEYS

United States Patent Office 3,330,481
Patented July 11, 1967

3,330,481
DISPERSANT DISPENSER OF AN ABSORBENT OR ADSORBENT MATERIAL
Harry S. Dearling, New York, N.Y., assignor, by mesne assignments, to Filtra, Inc., New York, N.Y., a corporation of New Jersey
Filed Oct. 22, 1965, Ser. No. 507,621
11 Claims. (Cl. 239—47)

This application is a continuation-in-part of copending application Ser. No. 440,725 filed Mar. 18, 1965, now abandoned.

This invention relates to atmospheric dispensing, and more particularly to a method and device for dispersing into the atmosphere of a desired surrounding a dispersant from a pre-pressurized bomb, a squeeze-bottle, or the like types of containers.

As used herein, the term "dispersant" is intended to mean a substance that is to be released or distributed in a finely-divided state, preferably gaseous or vaporous, into a pre-selected space such as a room for any of a multiplicity of purposes including to add a pleasant odor, to overcome an unpleasant odor, to apply a protective substance such as an insecticide, or to administer a medication ingested by the respiratory system.

Dispersants are commonly contained in vessels from which they are ejected by pressure. One such type of vessel is a bomb having a greater than atmospheric interior pressure due usually to a charge of a compressed fluid and is, therefore, considered a pre-pressurized dispenser. The dispersant is discharged when a valve is opened. Another type of vessel requires the application of pressure, such as by squeezing a pliable container, to discharge the dispersant. Still another type of container has a wick extending into the atmosphere from which the dispersant evaporates.

Those devices for dispersants and the method of using them have several disadvantages. Releasing the dispersant under pressure directly into the atmosphere produces a large concentration of the dispersant which may not permeate or be uniformly distributed in the surroundings and which may be utilized or exhausted too quickly. The release to the atmosphere of the dispersant is not sustained over a substantial period of time. Moreover, the high concentration may cause or increase untoward effects, such as irritation to plants and animals and damage to inanimate objects such as household furnishings and wares. Direct exposure to the discharge stream may cause destructive wet spots and leave stains. There is also always the danger that the dispersant may inadvertently be discharged onto a vital area of a human or animal. Inhalations in particular, being active pharmaceuticals in most cases, present problems in this respect. In the case of odorizers and deodorizers, it is highly desirable for them to be present for a prolonged period of time and, preferably, to be released continuously to the surrounding atmosphere during that period. Direct discharge from a pressure dispenser is not practically suited to achieve that end. Wick-type dispensers do not have certain of these disadvantages, but have other shortcomings. Such dispensers have an opening in the container for entry of the wick. Thus, the liquid is more or less exposed to the atmosphere rather than hermetically confined, and the danger and nuisance of spilling the contents is always present. Operation of the dispenser is often messy and usually results in direct contact of the fingers with the wet wick and liquid. Furthermore, the liquid often is squeezed off the wick when it is being drawn out of the container, and drips over and off the container. Obviously, of course, this type of dispenser is practically unsuitable for other than liquid dispersants.

An object of this invention is to provide an improved means for dispensing dispersants into a surrounding atmosphere. An object is also to provide a method for doing so. Another object is to provide dispensing means whereby dispersants can be dispersed at relatively uniform rates over prolonged periods of time. Still another object is to provide dispensing means which avoid discharging excessive concentrations of dispersants into the atmosphere while releasing sufficient amounts to make the dispersant available in the atmosphere for protracted periods. A further object is to provide a dispersant dispensing device that is readily adaptable to pre-pressurized and squeeze-bottle types of containers. Other objects of the invention will be in part described and in part apparent hereinbelow.

To aid in understanding the invention, reference will be made to the accompanying drawings wherein:

FIGURE 1 is a perspective asd shows partially a pre-pressurized dispenser and an embodiment of the dispensing means of the invention adapted thereto;

FIGURE 2 is an elevation partly in section along the line 2—2 of FIGURE 1;

FIGURE 3 is an elevation in section and shows another embodiment of the invention;

FIGURE 4 is a perspective and shows another embodiment of the invention;

FIGURE 5 is a perspective and shows a further embodiment of the invention;

FIGURE 6 is a section taken along the line 6—6 of FIGURE 5; and like reference numerals in the various figures indicate the same or substantially similar elements.

FIGURES 1 and 2 show the upper portion of a pre-pressurized dispenser 10 of conventional and commercial design. However, the removable cap ordinarily fitted over the bomb 10 is replaced by a cover 12 secured to the bomb 10 by ordinary means, such as swaging the lower periphery 14 over the upper flange 16 of the dispenser 10. The cover top 12a has a concave central portion 18 and a center opening 20 through which projects a discharge valve button 22. Thus, the uppermost portion of the button 22 is below the top 12a of the cover so that a plurality of dispensers can be stacked on one another without discharging.

In the cover top 12a are a number of openings 24. Similarly, the side wall 12b of the cover 12 also has a number of openings 26. The openings 24, 26 provide passages for air and dispersant to pass into and out of the cover 12. The openings need not have any particular configuration, but desirably should be large enough to permit free passage of ample amounts of air and dispersant without unnecessary reducing the strength of the cover 12. It is, of course, very desirable to style the openings attractively. Subject to those considerations, the openings can be located in the top 12a and/or the side wall 12b of the cover.

Within the cover 12 and extending downwardly from the top 12a is an annular neck 28. Spaced around and supported by the neck 28 is a disperser 30 which preferably extends down to the upper collar 32 of the bomb 10. The disperser 30 can be secured to the neck 28 and/or the collar 32 by means suitable to the conditions of use. The disperser 30 is preferably made of a porous, absorbent or adsorbent material, such as a wool, cotton or synthetic fabric or mass, felt or paper having relatively good wet strength.

To use the dispenser, the button 22 is depressed for a moment to release a quantity of the dispersant through the pre-pressurized bomb valve. The dispersant is projected from the valve ports 23 onto the absorbent or adsorbent disperser 30, but not directly into the atmosphere. The device is then allowed to stand in a convenient location while the dispersant desorbs from the disperser 30, diffuses through the openings 24, 26 and permeates the surrounding atmosphere.

The cover 12 can be removably fastened to the bomb 10. Thus, the cover 12 can be taken off and dispersant can be dispensed directly into the surrounding atmosphere in the known manner. Thereafter, replacement of the cover enables the device to be used as described for prolonged dispensing.

FIGURE 3 illustrates another embodiment wherein a cover 12c, similar to the cover 12 shown in FIGURES 1 and 2, has a push button 21 adapted to fit with and actuate the discharge valve button 22 of the bomb 10. The button 21 is secured, preferably for ease of construction, to a resilient, flexible cover top 12a, or can be mounted for vertical movement in the cover by known means. Such a cover 12c can be sold separately from a bomb, used with more than one bomb, and being removably fitted to a bomb permits conventional use by direct dispensing to the atmosphere as well as use according to the invention.

FIGURE 4 illustrates another embodiment of the invention. In place of the cover 12 described above, a disperser 30a in the form of an annulus is set directly on the top of the bomb 10, preferably fitted tightly, but detachably, on the collar 32. It could also, obviously, be fitted to the flange 16, especially to the inner periphery thereof. For additional support a perforated tubular piece 34 can be utilized with the disperser 30a directly attached to it, e.g., by an adhesive. This embodiment of the invention has the advantages that the disperser-support combination 30a, 34 can be made and sold as a separate unit for attachment to, and use and re-use with, ordinary pre-pressurized dispensers. Also, diffusion of the dispersant into the atmosphere can be positively prevented by placing the bomb's conventional cap on the bomb. Of course, a top similar to the top 12a of the cover 12 could be made part of the disperser-support 30a, 34.

Another embodiment of the invention is illustrated in FIGURES 5 and 6. FIGURE 5 shows a decorative disperser holder 36 having a stepped base 38, a side wall 40 with a plurality of vertical slots and a top piece or cover 42 having openings 43 and a central opening 44. Within the holder 36 and supported thereby is a disperser 30b of absorbent or adsorbent, porous material.

The holder 36 is so adapted a dispersant-containing pre-pressurized dispenser, or bomb 10, can be inserted thereinto with the discharge valve button 22a of the bomb 10 projecting out through the opening 44 in the top piece 42 and with the valve discharge ports 23 opposite the upper portion of the disperser 30b. Dispersant released from the bomb within the holder 36 is projected directly onto and absorbed or adsorbed by the disperser 30b, and by capillary action, gravity or the like travels the length of the disperser. The dispersant then is free to diffuse from the disperser 30b over a protracted time and permeate the surrounding atmosphere through the slots in the side wall 40 and the openings 43. It will be appreciated the slots and openings can be of various shapes and sizes for the passage of dispersant.

As shown in FIGURE 2, the bomb valve 22 has two discharge ports 23. More ports could be used as desired, for example, four as shown in FIGURE 6, the advantage being more uniform exposure of the disperser 30 to the dispersant projected from the valve for thorough saturation. It will be appreciated that different types of valves, e.g., operated by a toggle or having an upwardly directed discharge, can be used.

In such variations of the invention, it is desirable to adapt the cover and the disperser for easy access to the valve button and direct discharge of dispersant on the absorbent or adsorbent material. The disperser 30 shown in FIGURES 2 and 3 could be mounted on the interior of the cover side wall 12b and the neck 28 could be eliminated. Any convenient means can be employed to support the disperser 30b in the holder 36 of FIGURE 5.

The pre-pressurized bomb 10, of course, can be replaced by a squeeze-bottle or other type of container suitable for projecting dispersant onto the disperser.

It is to be understood that these and other modifications of the invention as illustrated by the drawings and specifically described above can be made by persons skilled in the art without departing from the invention as defined in the appended claims.

I claim:

1. A device for the distribution of a dispersant into a surrounding atmosphere over a protracted period of time which comprises a pre-pressurized container for said dispersant having in one end a discharge valve operated by a push-button, a cover over the valve end of said container and fitted thereto, said cover having a concave top, a first opening therein through which said push-button extends and a plurality of other openings, and a disperser of an absorbent or adsorbent material within said cover and around said valve whereby dispersant discharged from said container is projected substantially directly onto said disperser and diffuses therefrom through said openings into the atmosphere.

2. A dispersant dispensing device according to claim 1 wherein said disperser is an annulus detachably fitted to said container around said discharge means and is spaced from said discharge means and from said cover.

3. A dispersant dispensing device according to claim 2 further comprising a tubular support member having openings therein for said disperser.

4. A dispersant dispensing device according to claim 1 wherein said discharge valve has a plurality of discharge ports whereby dispersant is projected over substantially the entire surface of said disperser exposed to said discharge valve.

5. A dispersant dispensing device according to claim 1 wherein said cover is removably fitted to said container.

6. A device for the distribution of a dispersant into a surrounding atmosphere over a protracted period of time which comprises a pre-pressurized container for said dispersant having in one end a discharge valve operated by a push-button, a cover over the valve end of said container and fitted thereto, said cover having movable means for engaging and actuating said push-button and a plurality of openings, and a disperser of an absorbent or adsorbent material within said cover and around said valve whereby dispersant discharged from said container is projected substantially directly onto said disperser and diffuses therefrom through said openings into the atmosphere.

7. A dispersant dispensing device according to claim 6 wherein said cover is removably fitted to said container.

8. A device for the distribution of a dispersant into a surrounding atmosphere over a protracted period of time which comprises a pre-pressurized container for said dispersant having a discharge valve operated by a push-button, a holder into which said container is inserted having a plurality of openings in the walls, and a disperser of an absorbent or adsorbent material within said holder and surrounding said container whereby dispersant discharged from said container is projected substantially directly onto said disperser and diffuses therefrom through said openings into the atmosphere.

9. A device for the distribution of a dispersant into a surrounding atmosphere over a protracted period of time which comprises a pre-pressurized container for said dispersant having in one end thereof a discharge valve operated by a push-button, a cover over the end of said container having the valve, said cover being fitted to said container and having a first opening therein through which said push-button is accessible and a plurality of other openings, and a disperser of an absorbent or adsorbent material within said cover, said disperser being around and spaced from said valve whereby a spray of dispersant discharged from said container by actuation of said valve is projected therefrom substantially directly onto said disperser and is absorbed or adsorbed thereby, and said dispersant can diffuse from said disperser through said openings into the atmosphere.

10. A device for the distribution of a dispersant into a surrounding atmosphere over a protracted period of time which comprises a pre-pressurized container for said dispersant having in one end thereof a discharge valve operated by a push-button, a cover over the end of said container having the valve, said cover being fitted to said container and having movable means for engaging and actuating said push-button, said cover having a plurality of openings, and a disperser of an absorbent or adsorbent material within said cover, said disperser being around and spaced from said valve whereby a spray of dispersant discharged from said container by actuation of said valve is projected therefrom substantially directly onto said disperser and is absorbed or adsorbed thereby, and said dispersant can diffuse from said disperser through openings into the atmosphere.

11. A device for the distribution of a dispersant into a surrounding atmosphere over a protracted period of time which comprises a pre-pressurized container for said dispersant, said container having at one end thereof a discharge valve for discharging a spray of dispersant from within said container, push-button means on said container to actuate said discharge valve, a holder into which said container is fitted, said holder substantially enclosing said container and having a plurality of openings in the walls thereof, and a disperser of an absorbent or adsorbent material within said holder and substantially surrounding said container, said disperser being around and spaced from said valve, said discharge valve being adapted within said holder to discharge dispersant from said container as a spray projected substantially directly onto said disperser whereby said dispersant is absorbed or adsorbed thereon, and can diffuse from said disperser through said openings into the atmosphere.

References Cited
UNITED STATES PATENTS

| | | | |
|---|---|---|---|
| 1,818,684 | 8/1931 | Blechman | 239—57 |
| 2,928,573 | 3/1960 | Edelstein | 239—70 |
| 2,991,517 | 7/1961 | Bundy | 239—327 |
| 3,104,663 | 9/1963 | Laws | 222—394 |
| 3,139,218 | 6/1964 | Cairelli | 222—394 |
| 3,185,350 | 5/1965 | Abplanalp et al. | 222—394 |

FOREIGN PATENTS 477,291   1/1953   Italy.

M. HENSON WOOD, Jr., *Primary Examiner.*

ROBERT B. REEVES, *Examiner.*

R. S. STROBEL, VAN C. WILKS, *Assistant Examiners.*